UNITED STATES PATENT OFFICE.

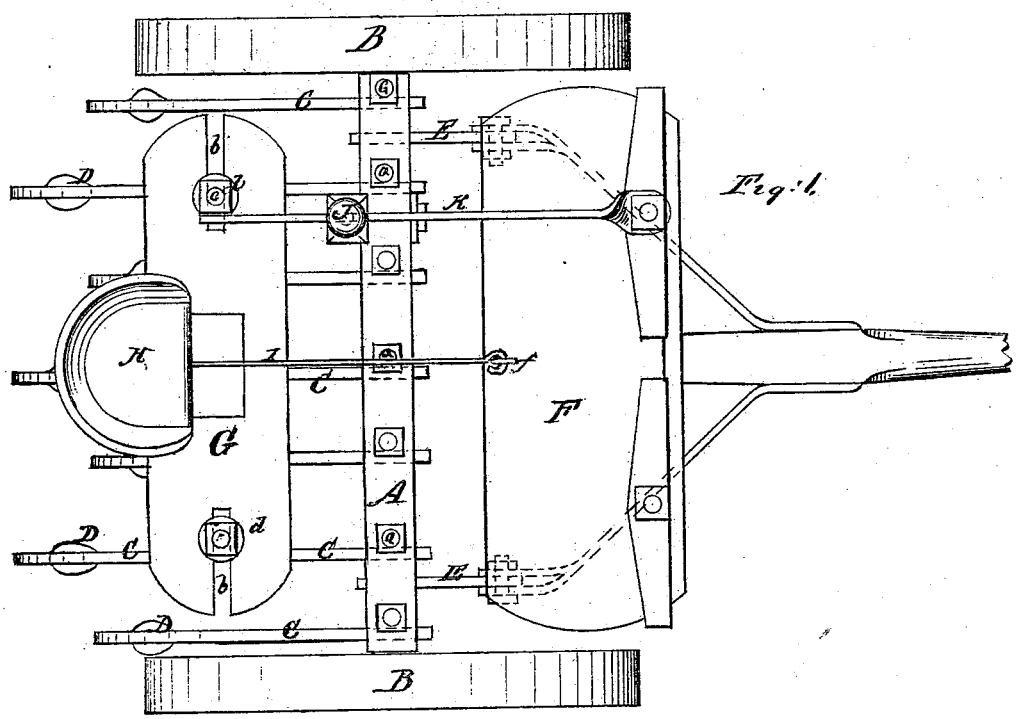

A. C. BRINSER, OF MIDDLETOWN, PENNSYLVANIA.

IMPROVEMENT IN CULTIVATORS.

Specification forming part of Letters Patent No. 94,067, dated August 24, 1869.

*To all whom it may concern:*

Be it known that I, A. C. BRINSER, of Middletown, in the county of Dauphin and State of Pennsylvania, have invented a new and useful Improvement in Cultivators; and I do hereby declare that the following is a full, clear, and exact description thereof, reference being had to the accompanying drawings, in which—

Figure 1 is a plan view; Fig. 2, a side elevation, one wheel being removed; and Fig. 3, a front elevation of the axle.

Like letters designate like parts in all the figures.

The nature of my invention consists in the peculiar construction of the axle, by means of which the shovels can be adjusted to any desired distance apart, also the manner of attaching the pole or shafts, and also in the arrangement by which the shovels are elevated above the ground.

To enable those skilled in the art to make and use my invention, I will proceed to describe its construction and operation.

In the drawings, A represents the upper portion of the axle, on which are wheels B B.

C represents curved arms, to the lower ends of which the shovels D are secured. In the upper edge, near the upper end of each of these arms C, are notches or recesses the same width as the axle A, which fits into them. Under these arms is a flat bar, A', which is secured to the upper part of the axle by bolts *a*. By forming the axle thus in two parts, as shown in Fig. 3, it will be readily seen that the shovels can be adjusted to any desired distance apart.

E E are curved arms, which are attached to the front of the axle in the same manner as the arms C are, and the pole or shaft is attached to their lower ends.

In front of the axle, and secured to the pole or shaft, is a platform, F, and in the rear of the axle is another platform, G, which is secured to two of the arms C. In each end of this platform are slots *b b*, through which the bolts *c c* pass. On the lower end of these bolts *c c* is a hook, which fits around the lower edge of two of the arms C, and on their upper ends are nuts *d*, by this means securing the platform G to the arms C. To the platform G is hinged a driver's seat, H, which is also connected to the front platform, F, by means of the rod I, one end of which hooks into a staple, *e*, in the under part of the seat H, and the other end hooks into a staple, *f*, in the front platform, F. To the side of the axle is secured a lever, J. To the front platform is attached a bar, K, which passes through a slot in the lever J. In the under side or edge of this bar is a notch, *g*, and at the bottom of the slot in the lever J is a projection, *h*.

Its operation is as follows: When the machine is in operation, if it is desired to elevate the shovels, it can be done in two ways: first, by the driver throwing forward the lever J, which brings the projection *h* in the slot of the lever into the notch *g* of the bar K, thus holding the shovels up until the lever J is released by raising the bar K; second, by the driver stepping from the rear platform onto the front one, thus placing his weight in front of the axle, thereby elevating the shovels.

It will be seen that by the connection of the seat H with the front platform in the manner heretofore described, to whatever position the shovels may be elevated, the horizontal position of the seat will always be preserved.

Having thus fully described my invention, what I claim, and desire to secure by Letters Patent, is—

1. The combination of the platform F and G and seat H, substantially as shown and described.

2. The axle A A', in combination with the curved arms C and E, when constructed substantially as shown and described.

A. C. BRINSER.

Witnesses:
HENRY STEHMAN,
EMANUEL ALBERT.